March 18, 1969 E. MALBEC 3,433,170

UNIVERSAL ROTARY VOLUMETRIC-PULSATION MACHINE

Filed Feb. 11, 1966 Sheet 1 of 3

Inventor:
Edouard Malbec
By
Karl W. Flocks
Attorney

United States Patent Office 3,433,170

Patented Mar. 18, 1969

3,433,170

UNIVERSAL ROTARY VOLUMETRIC-PULSATION MACHINE

Edouard Malbec, 32 Rue Viatal Carles, Bordeaux, Gironde, France

Filed Feb. 11, 1966, Ser. No. 526,781

Claims priority, application France, Jan. 12, 1966, 45,699

U.S. Cl. 103—149 7 Claims

Int. Cl. F04b *43/08*

ABSTRACT OF THE DISCLOSURE

A rotary machine having a rotor with peripheral rollers on which hollow deformable tubes are applied with a pressure which can be regulated. When a fluid under pressure is sent into the tubes the rotor rotates and the machine is a motor. When the rotor is rotated, fluid can be moved in the tubes and the machine is a pump.

The present invention relates to a universal volumetric-pulsation machine, that is to say which utilizes the successive compression and expansion of a fluid of any kind and which is capable of operating either as a motor, when supplied from an external source of pressure, or as a compressor, vacuum machine or pump when driven by a motor coupled to the machine.

There are known for example various kinds of pumps either of the piston or rotary type (with eccentrics, vanes or rotary pistons) which constitute volumetric pumps utilizing a cycle of compression and expansion of a gas; centrifugal gas-pumps and gas-compressors are also known.

Now, these various machines often have a high cost of production and can only be made on a small scale with difficulty, by reason of their weight, of their bulk and of the complexity of their mechanism.

In addition, other disadvantages also derive from the fact of the discontinuous movements of the pistons or valves necessary in certain machines belonging to these types, and resulting in irregularity of output; they derive also from the fact of the rapid wear of certain parts of the machines, rotary or otherwise, which wear is due either to mechanical causes or to the use of a polluting or corrosive circulating fluid, resulting rapidly in a stoppage of the machine. Furthermore, due to the complexity of the internal circuits of hydraulic or gaseous fluids, the absolute fluid tightness of such machines is often difficult to attain and necessitates the provision of members such as packing glands; finally, frequent lubrication is necessary for certain moving parts of this machine.

The present invention provides a machine which can operate equally well as a motor or as a generator, and which does not have the various disadvantages referred to above.

In fact, the rotary volumetric-pulsation machine according to the invention is of simple construction and operation, permitting of easy manufacture and a low production cost. Its weight and its bulk permit of small dimensions during its construction. Moreover, due to the absence of substantial mechanical friction and to its absolute fluid-tightness, the machine according to the invention is of great strength and is silent in operation.

Its continuous movement of rotation and the progressive variations of pressure of the fluid circulating in the machine result in a uniform output and a very good efficiency irrespective of the dimensions of the machine and of the characteristics of the circulating fluid, the whole of which affect the power of the machine.

To this end, the rotary universal volumetric-pulsation machine is essentially characterized by the fact that it is constituted on the one hand by a rotor formed by a cylindrical cage rotating about a central shaft and comprising freely-rotating rollers distributed peripherally along generator lines of the cylinder of the cage, and on the other hand, of longitudinal volumetric elements disposed around the rotor and applied against the rollers with a mechanical contact pressure sufficient for any fluid passing through them to create, by successive compressions and expansions, a driving torque causing the rotor to rotate in the case where a fluid is sent under pressure into at least one of the volumetric elements and in order that the suction and the delivery of the said fluid may be effected when the rotor is driven by an auxiliary motor.

According to other characteristic features:

The longitudinal volumetric elements are constituted by an elastic material having sufficient mechanical strength for rolling such as an elastomer.

In an alternative form, the longitudinal volumetric elements are constituted by a non-elastic material with sufficient mechanical strength during rolling such as a metal in a thin sheet, and are arranged, together with at least the cage-rotor of the machine, in a casing in which exists a vacuum sufficient to create artificial elasticity of the volumetric elements by the effect of the difference in pressure between the fluid external to the machine, and which passes through the said volumetric elements, and the vacuum existing inside the casing.

The longitudinal volumetric elements are of tubular form.

The volumetric elements of tubular form have a conical section in the longitudinal direction, so as to produce a progressive variation of the pressure of the fluid circulating in each of the elements, together with an automatic cooling of the elements.

Certain volumetric elements, arranged round the motor, are connected to each other in all possible ways, namely in series and in opposition at will, the extremities of the said elements being respectively coupled to the central suction and delivery orifices of a collector.

A number of rotary volumetric-pulsation machines are associated, on the same shaft or not on the same shaft, with an appropriate balancing, so as to produce a multicellular machine.

Other advantages and characteristic features of the present invention will become apparent from the description which follows below, reference being made to the accompanying drawings, in which.

Figure 1:
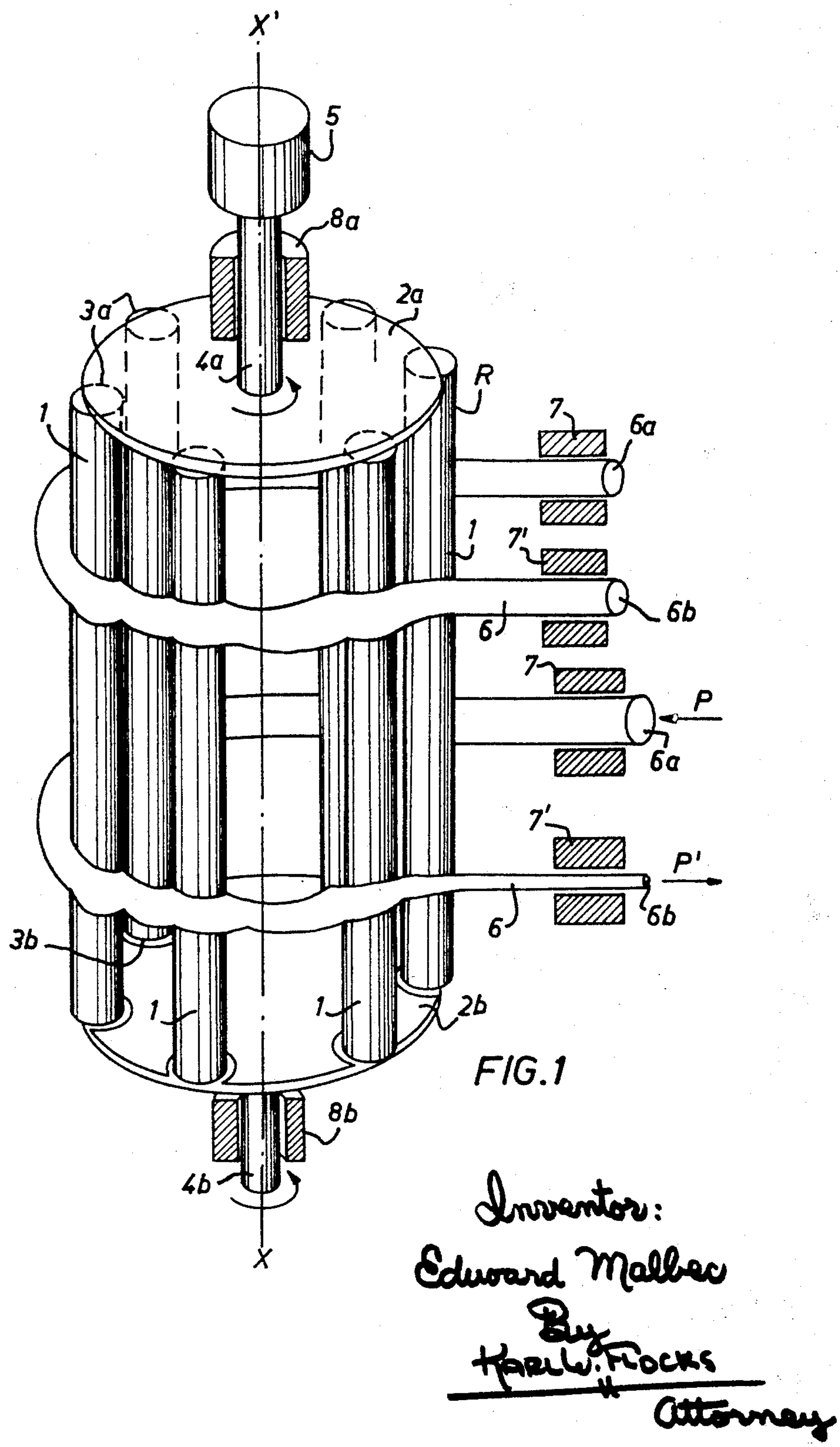
FIG. 1 is a diagrammatic view in perspective of a first possible form of construction of a machine according to the invention.

Referring to FIGS 1 and 1A the rotor of the machine according to the invention is constituted by the cylindrical cage R formed by rollers or bars 1 arranged along the generator lines of the cylinder, and by plates or discs 2*a* and 2*b* mounted respectively at the two extremities of the cylinder and perpendicular to its axis X–X' The rollers 1 rotate freely in the bearings 3*a* and 3*b*, shown diagramamtically, these bearings being respectively mounted of the discs 2*a* and 2*b*.

The cage R is fixed to a central shaft 4, one extremity 4*a* of which can be coupled to the shaft of a driving motor 5 for operation as a pump, compressor or vacuum machine, for example.

There has been shown diagrammatically at 6 a longitudinal volumetric element of the machine according to the invention; this element 6 is shown in the form of a hollow elastic tube applied with a sufficient contact pressure against the rollers 1 of the cage R, so that when this latter is driven in its movement of rotation, each of the elements 6 is subjected to deformation which affects the pressure and the volume of the fluid contained in the section of the element located between two bars. In addition, the suction orifice 6*a* and the delivery orifice 6*b* (or low-pressure and high-pressure orifices) of each of the elements 6, of which only two have been shown in FIG. 1, are respectively coupled to the main conduits of a collector.

Finally, these elements 6 can be mounted in all possible ways round the cage R, that is to say either in series (by connecting the delivery orifice 6*b* of each of the elements 6 to the suction orifice 6*a* of another adjacent element), or in opposition (by connecting on the one hand the suction orifices to each other and the delivery orifices to each other on the other hand); it is also possible to associate a number of machines on the same shaft or not, with a suitable balancing so as to produce a multi-cellular machine corresponding to the power and the output of fluid desired.

In FIG. 1, there have been shown diagrammatically at 7 and 7′ supporting members of the volumetric elements 6 and bearings 8*a* and 8*b* respectively for the shaft ends 4*a* and 4*b* of the rotor-cage R, these supporting members 7, 7′ and the bearings 8*a*, 8*b* forming part of the frame (not shown) of the machine.

Referring to the diagram of FIG. 2 and also to FIG. 1 the operation of the machine according to the invention is as follows:

Each volume of the fluid comprised in a section of the volumetric element 6 between two bars 1*a* and 1*b* is subjected, during the course of rotation of the rotor-cage R, to successive compressions and expansions or suctions.

Figure 2:
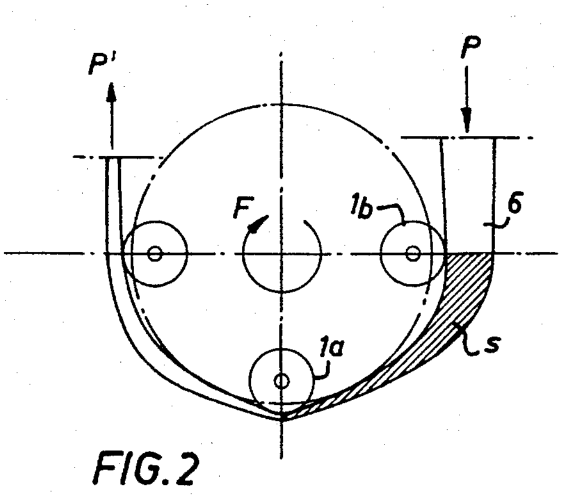
FIG. 2 shows diagrammatically the principle of operation of a machine according to the invention, such as shown in FIG. 1, and illustrates especially the deformation given to an elastic element and the path followed by the fluid in circulation.
Figure 4:
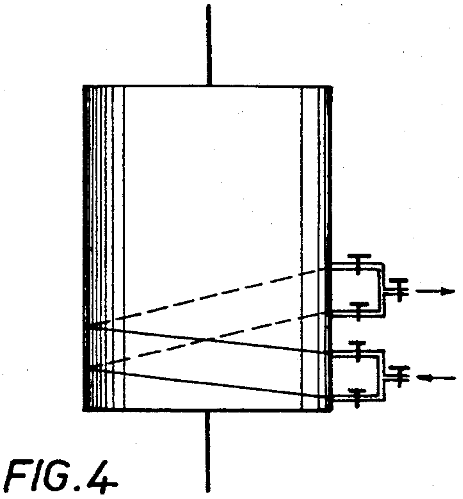
FIG. 4 shows diagrammatically the parallel connection of volumetric elements.

Thus, in operation as a motor in FIG. 2, a fluid under pressure P sent into the element 6 through tthe intermediary of the collector expands successively in the section *s* of the element 6 comprised between two bars, and by reasons of the elasticity of the volumetric element 6, produces a torque on the rotor-cage R by action on the rollers 1 which are free to rotate. The rotation of the cage is effected by "pulsations" due to the successive expansions, the fluid under pressure at the inlet P passing out at a pressure $P'<P$ and this drop in pressure is utilized very progressively during the course of rotation of the rotor-cage R in the direction indicated by the arrow F in FIG. 2. The result is that the power of the motor and its speed of rotation are essentially a function of the pressure P of the fluid at the inlet, of the radius of the rotor-cage R, of the section, the length, the number and the various characteristics of the volumetric elements 6 and their contact pressure on the rollers 1 of the rotor-cage R.

In particular, in one preferred form of construction, the volumetric elements 6 have a conical section (FIG. 1), so that during the course of the progression of the fluid employed in the element 6, the surface on which its pressure is applied increases at the same time as the pressure falls, thus ensuring an entirely gradual and total utilization of the pressure of the fluid, resulting a good efficiency and also providing an automatic cooling of the volumetric elements due to the reduction of temperature induced by the abrupt expansion of the fluid.

In operation as a compressor, vacuum machine or pump, the rotor-cage R is driven by means of an auxiliary motor 5, shown diagramatically in FIG. 1, in the direction indicated by the arrows on this same figure. The periodic deformation of each section of the volume of the element 6 comprised between two rollers 1 produces periodic and alternate suctions followed by compressions, so that the fluid is evacuated under pressure towards the collector. In the case of operation as a pump, the priming is instantaneous and the speed of rotation may be low. In all cases, high compressions can be obtained by utilizing volumetric elements having a conical section and in which the ratio of conicity is sufficiently high, while at the same time the temperature of the fluid employed is not increased abnormally for the same reasons as previously indicated.

Figure 3:
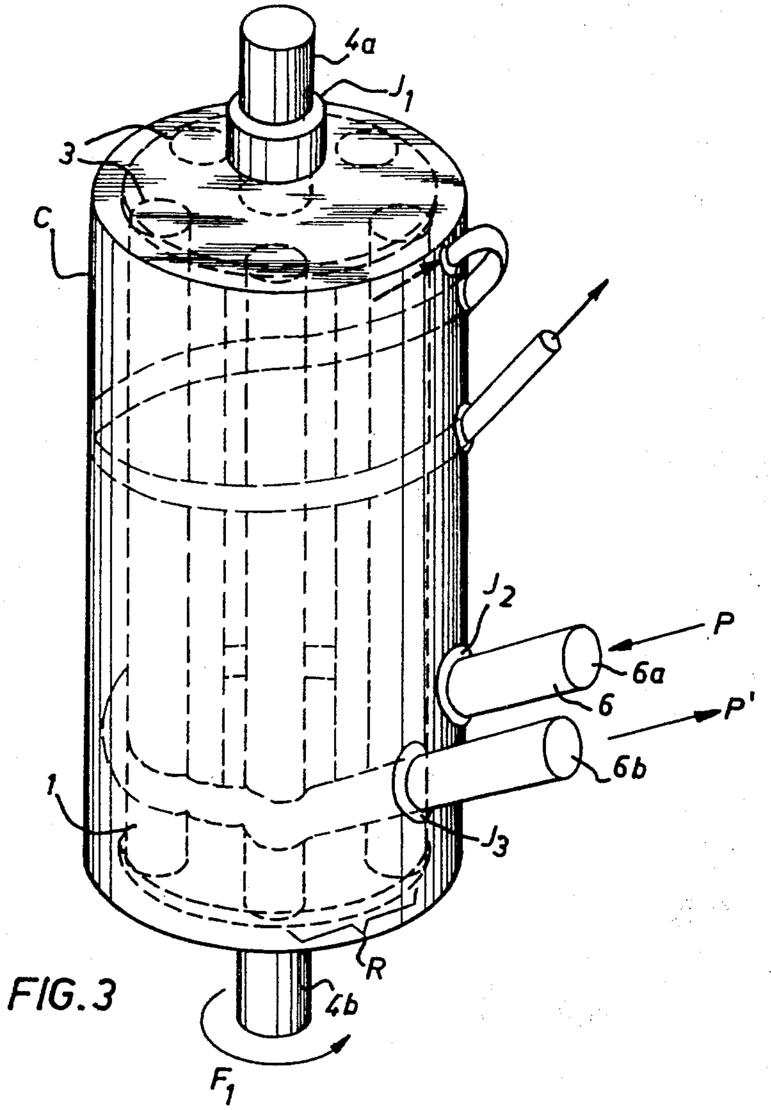
FIG. 3 shows diagrammatically in perspective a further alternative form of a rotary machine according to the invention, and in which non-elastic volumetric elements are employed with a series auxiliary volumetric element.

Referring now to FIG. 3 which shows diagrammatically a perspective view of a second alternative form of the machine according to the invention, which is particularly advantageous for operation as a pump or compressor, the cage-rotor R with its bars 1 freely rotating in bearings 3, is enclosed in a fluid-tight casing C in which there exists an adequate vacuum. The driving shaft 4*a*, 4*b* of the rotor 1 is coupled externally to an electric motor for example, which puts the machine into rotation in the direction of the arrows F1. A hollow volumetric element 6, constituted by a non-elastic thin material which is resistant to rolling, for example, stainless steel, is arranged with sufficient mechanical pressure around the bars 1 of the cage R. The extremity 6*a* of the element 6 forms the suction extremity at the pressure P, while the extremity 6*b* corresponds to the delivery orifice at the pressure P′.

It is clear that while only a single volumetric element has been shown for the sake of clearness of the drawing, it is possible to arrange around the rotor R any number of these elements and to associate them with each other in all possible ways, either in series or in opposition, their extremities being coupled respectively to central suction and delivery orifices of a collector.

In addition, the casing C is made fluid-tight by any appropriate devices such as the fluid-tight joints $J_1$, $J_2$, $J_3$ respectively for the shaft 4 of the machine and the suction extremity 6*a* and delivery extremity 6*b* of the element 6.

The operation of the machine as a pump or compressor is then as follows:

When the rotor R is driven by the auxiliary motor (not shown on the drawing), each section of an element 6 comprised between two rollers 1, is subjected to periodic deformation due to mechanical rolling, the section rapidly returning to its largest volumetric capacity between the passage of two rollers 1, due to the artificial elasticity created by the difference of pressure between the interior of the casing C subjected to a vacuum, and the external pressure P of the fluid which is delivered at the extremity 6*b* at the pressure P′.

The vacuum is the casing C may furthermore be maintained by means of one or more volumetric auxiliary elements (not shown on the drawing) rolled by the bars 1 of the rotor R. The suction orifice of an element of this kind is fixed to the interior of the casing C, while its delivery orifice emerges from the exterior of this latter.

By acting on the mechanical tension of this element on the rollers 1, through the intermediary for example of its delivery extremity, the starting-up or stopping of the operation of this element can be controlled when the vacuum is respectively insufficient or sufficient.

In the above alternative form, it should be noted that the speed of rotation of the machine can be substantially increased due to the smaller inertia of the deformable elements.

There is also obtained a better filling of these same elements by the fluid which passes through them, at the same time ensuring acceptable friction, which results in an improvement in the efficiency of the machine.

Finally, the operation of the machine according to the invention, as shown in FIG. 3, is perfectly silent because of the non-transmission of vibrations of all kinds in the vacuum surrounding the rotor of the machine.

It will of course be understood that the present invention has been described and shown purely by way of explanation only and not in any limitative sense, and that any alternative constructional forms can be made without thereby departing from its scope.

In particular, it is possible to employ in the machine according to the invention, any fluid, gaseous or liquid or in powder, granular and other forms under all conditions of operation.

All industrial and laboratory applications can be achieved with the outputs, speeds of rotation and powers desired.

In particular, it is possible to effect the automatic and continuous dosage of the heterogenous constituents of a mixture by using on a pump according to the invention, a sufficient number of volumetric elements suitably arranged, with sections appropriate to the desired proportions of the constituents of the mixture.

The elastic volumetric elements may be made of any material having an adequate coefficient of elasticity and suitable strength.

The rollers of the rotor may be mounted freely in any manner, by means of ball or roller bearings, and the means for ensuring sufficient contact pressure of the volumetric and elastic elements on these rollers may take any desired form.

I claim:

1. A universal rotary machine of the kind operating by the action of volumetric pulsations, characterized by the fact that it is constituted by the combination:

of a cylindrical cage-rotor comprising rollers free for rotation and distributed along the generator lines of said cylinder;

and at least one volumetric element of tubular form disposed around said rotor against said rollers with a sufficient mechanical contact pressure, said volumetric elements being constituted by an elastic material resistant to rolling, whereby the successive compressions and expansions of a fluid passing through said elements create a driving torque driving said rotor in a movement of rotation in the case where said fluid is sent under pressure into at least one of said volumetric elements and, in the case where the rotor is driven by an auxiliary motor, the suction and delivery of said fluid, said volumetric elements having a conical section in the longitudinal direction, whereby there is obtained a progressive variation of the pressure of the fluid circulating in each of said elements, together with an automatic cooling of said elements.

2. A universal rotary machine of the kind operating by the action of volumetric pulsations, characterized by the fact that it is constituted by the combination:

of a cylindrical cage-rotor comprising rollers free for rotation and distributed along the generator lines of said cylinder;

and at least one volumetric element of tubular form disposed around said rotor against said rollers with a sufficient mechanical contact pressure, said volumetric elements being constituted by an elastic material resistant to rolling, whereby the successive compressions and expansions of a fluid passing through said elements create a driving torque driving said rotor in a movement of rotation in the case where said fluid is sent under pressure into at least one of said volumetric elements and, in the case where the rotor is driven by an auxiliary motor, the suction and delivery of said fluid, a certain number of said volumetric elements being arranged around said rotor and connected to each other through the intermediary respectively of their inlet and outlet orifices, by connecting them in series in a first case and in parallel in a second case, said orifices being respectively coupled to the central suction and delivery orifices of a collector.

3. A universal rotary machine of the kind operating by the action of volumetric pulsations, characterized by the fact that it is constituted by the combination:

of a cylindrical cage-rotor comprising rollers freely mounted for rotation and distributed along the generator lines of said cylinder;

of at least one volumetric element of tubular form and constituted by a non-elastic material of appropriate mechanical strength to rolling, said volumetric elements being disposed around said rotor against said rollers with an appropriate mechanical contact pressure;

of a fluid-tight casing in which exists a vacuum sufficient to create an artificial elasticity of said volumetric elements under the effect of the difference of pressure existing between the fluid external to the machine and passing through said volumetric elements and the vacuum existing in the interior of said casing, said casing containing at least said rotor and at least a part of said volumetric elements;

and means for ensuring the fluid-tightness of said casing.

4. A universal rotary machine as claimed in claim 3, in which said non-elastic material constituting said volumetric elements is a metal in a thin sheet, resistant to rolling.

5. A universal rotary machine as claimed in claim 3, in which said machine is driven by an auxiliary motor enclosed in said casing rendered fluid-tight through the intermediary of said means.

6. A universal rotary machine of the kind operating by the action of volumetric pulsations, characterized by the fact that it is constituted by the combination:

of a cylindrical cage-rotor comprising rollers freely mounted for rotation and distributed along the generator lines of said cylinder;

of at least one volumetric element of tubular form and constituted by a non-elastic material having an appropriate mechanical strength to rolling, said volumetric elements being disposed around said rotor against said rollers with an appropriate mechanical contact pressure;

of a fluid-tight casing in which exists a vacuum sufficient to create an artificial elasticity of said volumetric elements by the effect of the difference of pressure existing between the fluid external to the machine and passing through said volumetric elements and the vacuum existing in the interior of said casing, said casing containing at least said rotor and at least part of said volumetric elements;

at least one auxiliary volumetric element rolled by said rollers of said rotor and comprising a suction orifice fixed at the interior of said casing, whereby the vacuum is automatically maintained by the rolling action on said element;

and means for ensuring perfect fluid-tightness of said casing.

7. A universal rotary machine as claimed in claim 6, in which the operation and the stopping of said auxiliary volumetric element are effected by regulating the mechanical pressure of said element on the rotor of said machine.

References Cited

UNITED STATES PATENTS

| | | | |
|---|---|---|---|
| 3,172,367 | 3/1965 | Kling | 103—149 |
| 453,277 | 6/1891 | Nickerson et al. | 230—168 |
| 2,911,827 | 11/1959 | Hanks | 91—57 |
| 3,079,868 | 3/1963 | Ormsby | 103—149 |
| 3,105,447 | 10/1963 | Ruppert | 103—149 |
| 3,303,748 | 2/1967 | Duryee et al. | 91—57 |

DONLEY J. STOCKING, *Primary Examiner.*

WILBUR J. GOODLIN, *Assistant Examiner.*